April 22, 1924.
W. A. LORENZ
SHRINKING HAT BODIES
Filed March 17, 1920
1,491,484
Fig. 3
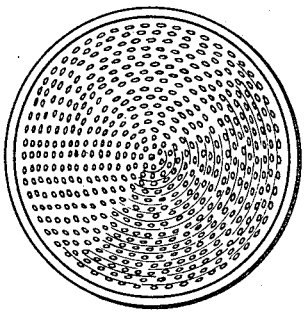
Fig. 4
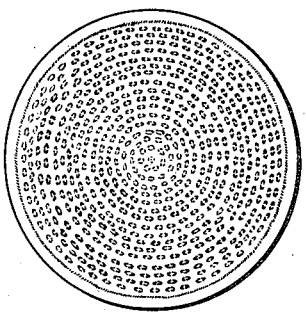
Fig. 1
Fig. 2
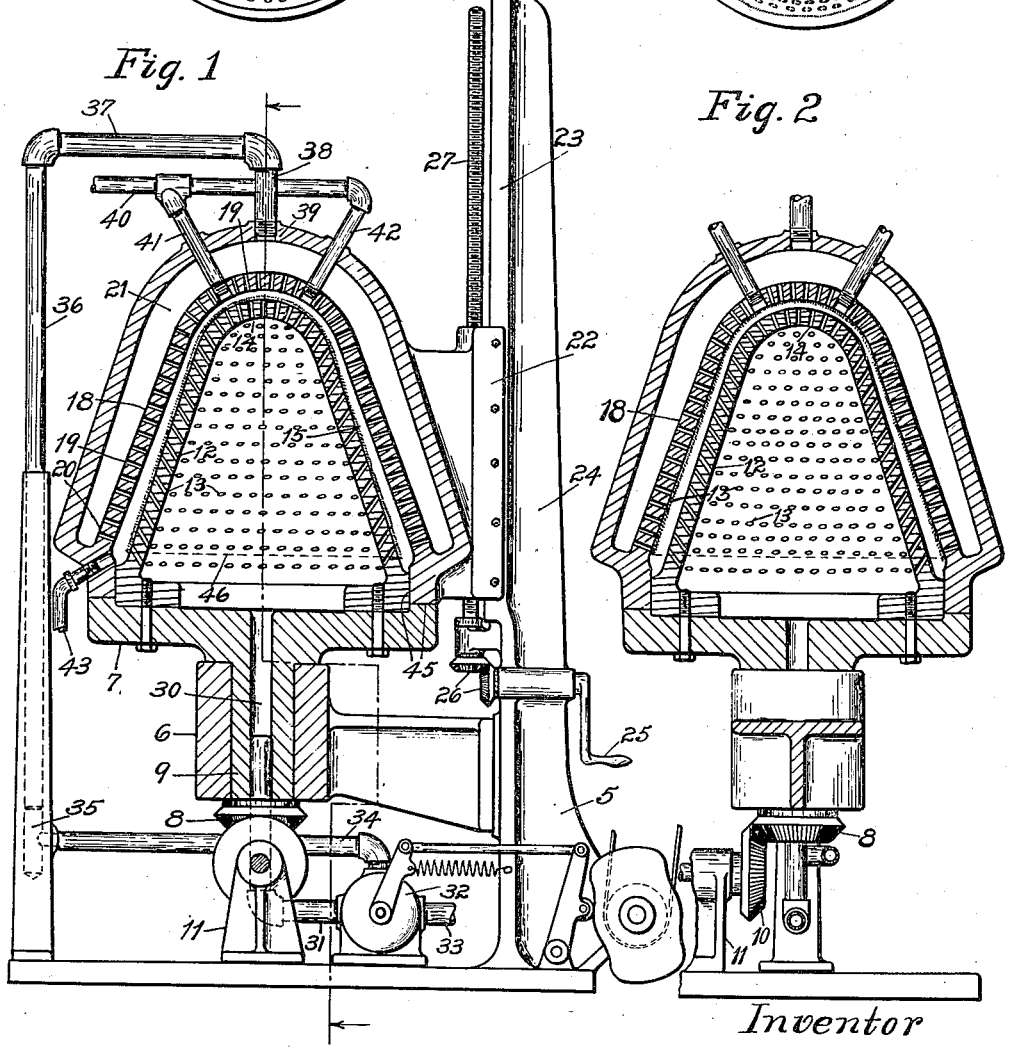
Inventor
William A. Lorenz
by William A. Lorenz
Atty.

Patented Apr. 22, 1924.

1,491,484

UNITED STATES PATENT OFFICE.

WILLIAM A. LORENZ, OF HARTFORD, CONNECTICUT, ASSIGNOR TO UNITED STATES HAT MACHINERY CORPORATION, OF RICHMOND, VIRGINIA, A CORPORATION OF VIRGINIA.

SHRINKING HAT BODIES.

Application filed March 17, 1920. Serial No. 366,468.

*To all whom it may concern:*

Be it known that I, WILLIAM A. LORENZ, a citizen of the United States, residing at Hartford, in the county of Hartford and State of Connecticut, have invented new and useful Improvements in Shrinking Hat Bodies, of which the following is a specification.

This invention relates to a process for shrinking a fur hat body. In the well known process of forming hat bodies, the fur is blown upon a perforated cone until the desired amount is deposited thereon, the fur being held to the cone by suction. When the proper amount of fur has been deposited on the cone, the cone with the body is removed from the machine and dipped into scalding water or liquor, which starts the operation of felting the fur fibres together.

In this condition the perforated cone upon which the hot body has been thus formed, is transferred into the shrinking machine; another perforated cone is placed over the first cone, when the process of this invention may be carried out.

In the drawings Figure 1 shows the machine, a portion thereof being in section. Fig. 2 shows the cone portion of the machine of Fig. 1, with the fur on the cone. Fig. 3 shows a plan view of the inner cone without any fur thereon, and Fig. 4 shows the cone with a fur body thereon.

In the drawings, an upright 5 is shown having a projecting bracket 6, for supporting the cone table 7. This table 7 is rotated at the desired speed, by means of a bevel 8 attached to the lower end 9 of the turntable. Another bevel 10 in bracket 11 may be driven by any suitable means, so as to rotate the table 7 at the proper speed. This rotation may be slowly continuous, or may be intermittent; that is, having a short step by step motion. The turntable supports the inner cone 12 which is perforated at 13. This cone 12 may be fastened to the turntable 7.

The holes 13 are preferably inclined upwardly, while the upper holes 14 may be disposed vertically or slightly radially. Upon this cone 12 is shown a fur hat body 15, that has been blown on the cone and partially felted.

Surrounding the inner cone 12 is placed an outer cone 18, which is also perforated at 19—19. The inner surface of this outer cone is placed close to the outer surface of the hat body 15. The space between the two cones 12 and 18, at the upper portion of the cone is closer near 19, than the space between the two cones near 20.

The outer cone is made with a hollow chamber as at 21, and is secured to the arm 22, the whole being carried by a slide 23, on the upright 24. A crank handle 25, by means of bevel gears 26, turning the screw 27, enables the entire outer cone to be elevated above the inner cone, so that a hat body may be placed on the inner cone or removed therefrom.

The inner cone is hollow and connects with a passageway 30, and through a pipe 31, with a 2-way valve in a casing 32. Air may be exhausted from this casing through a pipe 33 with a suitable exhaust pump. The casing 32 is provided with an outlet at its upper portion connected to pipes 34, 35, 36, 37 and 38, secured to the top portion of the outer cone at 39.

When the valve in the casing 32 is turned by means of proper mechanism, air will be exhausted through the series of pipes, and from the space 21, in the outer cone. In other words, atmospheric air is admitted to the interior of cone 12, so that the pressure in said cone is in equilibrium with outside atmospheric pressure. This operates to release the hat body from the cone 12, and to jump across the space between the cones, and deposit itself upon cone 18. This operates to slightly stretch the conical hat body.

By reversing the operation of the mechanism and of the valve in casing 32, the air will be cut off from the outer cone 21, and cone 18, and a vacuum will be created in cone 12 which will draw the hat body back upon the surface of the cone 12. This will tend to slightly compress the hat body, permitting the felting operation to take place.

By repeating this operation rapidly; that is, several hundred vibrations per minute, the shrinking will take place at each impulse to a slight extent.

The pipe 40 is connected to two pipes 41 and 42, which are threaded in the upper portion of the outer cone 18. Scalding water or liquor may be introduced into the cone through these pipes, at suitable intervals, which water may be drawn off through the pipe 43.

Fig. 2 shows the fur body 15, sucked upon the inner surface of the outer cone 18. At this time the inner cone 12 is rotated a slight amount, so as to mismatch the holes 13 and 14 with the body when it returns to the inner cone 12. The rotation to a slight amount is accomplished by turning the shaft by any well known step by step ratchet device, such attachment, however not being shown, but should be attached to the shaft to which the bevel gear 10 is connected.

The outer cone 18—21 does not revolve, as does the inner cone, the junction of these parts being at 45. At this point packing may be introduced if necessary.

As the hat body is shrunken it grows thicker and shorter; the lower end of the body is shown at 46.

The vibration of the hat body, by the action of the vacuum, created alternately in the chamber 21 and the interior of the cone 12, is efficiently carried on until sufficient of the holes 13 are uncovered, because of the shortening of the hat body, to interfere with the creation of an efficient vacuum in the chamber 21 and cone 12. Up to this point the apparatus produces the desired rapid vibration of the hat body whereby a hat body, shrunken and felted to a predetermined degree, is produced. In other words the arrangement of the holes in the cone 12 is such as to govern and control the extent of vibratory treatment to be accorded to a given hat body. If, however, further shrinkage of the particular hat body is desired, subsequent to the uncovering of the holes 13 in sufficient numbers to interfere with the alternate creation of an active vacuum in the chamber 21 and cone 12, it is obvious that the shrunken hat body may be transferred to another machine of the same character having a more restricted area of perforations than that of the first machine or in which the holes 13 may be differently arranged to accord with the desired shrunken condition of the hat body at this stage. The vibration of the hat body shrunken in the first machine will then be continued in the second machine in exactly the same manner as in the first, i. e., by the production of a vacuum alternately upon opposite sides of said hat body. The transfer of the shrunken hat body to successive machines may be continued so long as further shrinking of the hat body is desired. Or if it is desired to avoid the necessity for transferring the hat from cone to cone, suitable means may be included in the apparatus for progressively closing those holes 13 as the lower rows thereof may become uncovered as the shrinking of the hat body proceeds. For the purpose of simplification, however, said means have been omitted from the drawings as such means are merely supplemental to the subject matter of this invention which is directed primarily to the operation of shrinking a hat body by means of vibrations imparted thereto as the result of alternately set up vacuums operative on opposite faces of the hat body.

The invention claimed is:

1. The process of shrinking a fur hat body, which consists in placing a hat body upon an inner perforated cone or "form;" then placing an outer perforated cone around the outside of the inner cone; and in blowing or drawing the hat body, from the surface of one cone to the surface of the other cone, thereby exerting pressure on the body, and in then reversing the transferring or blowing operation.

2. The process of shrinking a fur hat body, which consists in placing the hat body upon a perforated cone; then placing an outer perforated cone around the outside of the inner cone, with a space between the surfaces of the two cones; and in rapidly transferring the hat body from one cone to the other by air pressure, and in repeating the operation alternately; and in scalding the hat body at intervals.

3. The process of shrinking a fur hat body, which consists in placing a hat body upon an inner perforated cone; then placing an outer perforated cone around the outside of the inner cone with a space between the perforated surfaces of the two cones; then in alternately blowing or drawing the hat body from one cone to the other cone, blowing it to a greater extent at the lower end of the cones, than at the upper ends of the cones, so as to increase the pressure thereby at the lower or brim end of the hat body; and in scalding the hat body at suitable intervals.

4. The process of shrinking a fur hat body, which consists in rapidly vibrating the hat body from an inner perforated cone towards an outer perforated cone, and vice versa, and thereby exerting pressure upon the hat body at each impulse, or vibration; and in scalding the hat body at proper intervals.

5. In an apparatus for shrinking fur hat bodies, means for shrinking a fur hat body, consisting of a perforated inner cone, a perforated outer cone, and having a space between the two cones for the introduction of a fur hat body, means for vibrating the hat body from one cone to the other cone, and vice versa, means for exerting pressure upon the hat body at each impulse or vibration, and means for scalding the hat body with hot liquor at proper intervals.

6. A hat-shrinking machine comprising an inner perforated cone, an outer perforated cone separated therefrom, and means for causing the hat body to vibrate back and forth between said cones by fluid pressure.

7. A hat-shrinking machine comprising an inner perforated cone, an outer perforated cone separated therefrom, means for causing the hat body to vibrate back and forth between said cones by fluid pressure, and means for effecting relative rotation of the cones.

8. A hat-shrinking machine comprising an inner perforated cone, an outer perforated cone separated therefrom, means for causing the hat body to vibrate back and forth between said cones by fluid pressure, and means for effecting relative rotation of the cones step by step.

9. A hat-shrinking machine comprising an inner perforated cone, an outer perforated cone separated therefrom, means for causing the hat body to vibrate back and forth between said cones by fluid pressure, and means for supplying water to moisten the hat body during the shrinking operation.

10. A hat-shrinking machine comprising an inner perforated cone, an outer perforated cone separated therefrom, means for causing the hat body to vibrate back and forth between said cones by fluid pressure, and means for supplying water to moisten the hat body during the shrinking operation comprising an inlet pipe connected with the outer cone.

11. A hat-shrinking machine comprising an inner perforated cone, an outer perforated cone separated therefrom, means for causing the hat body to vibrate back and forth between said cones by fluid pressure, and means for effecting rotation of the inner cone.

12. A hat-shrinking machine comprising an inner perforated cone, an outer perforated cone separated therefrom, and means for causing the hat body to vibrate back and forth between said cones by fluid pressure, said cones being mounted for relative displacement to give access to the inner cone.

13. A hat-shrinking machine comprising an inner perforated cone, an outer perforated cone separated therefrom, means for causing the hat body to vibrate back and forth between said cones by fluid pressure, and a lifting device whereon said outer cone is mounted to lift it clear of the inner cone.

14. A hat-shrinking machine comprising an inner perforated cone, an outer perforated cone separated therefrom, said inner cone having an interior chamber, said outer cone surrounded by an exterior chamber, and means for exhausting air from said chambers in alternation.

15. A hat-shrinking machine comprising an inner perforated cone, an outer perforated cone separated therefrom, said inner cone having an interior chamber, said outer cone surrounded by an exterior chamber, and means for automatically exhausting air from one of said chambers while atmospheric air is admitted to the other of said chambers, and for repeatedly reversing the operation to cause the hat body to be blown back and forth from one cone to the other.

16. A hat-shrinking machine comprising an inner perforated cone, an outer perforated cone separated therefrom, said inner cone having an interior chamber, said outer cone surrounded by an exterior chamber, and means for exhausting air from said chambers in alteration, the perforations in said inner cone being inclined upwardly and outwardly.

17. A hat-shrinking machine comprising an inner perforated cone, an outer perforated cone separated therefrom, and means for causing the hat body to vibrate back and forth between said cones by fluid pressure, said cones being so proportioned and placed that the space between them narrows at the apex portions of the cones and widens at the base portions of the cones.

18. A hat-shrinking machine comprising an inner perforated cone, an outer perforated cone separated therefrom, means for causing the hat body to vibrate back and forth between said cones by fluid pressure, means for effecting rotation of the inner cone; said cones being mounted for relative displacement to give access to the inner cone, means connected with said inner cone to exhaust and admit air thereto in alternation at all rotative positions of the cone, and means connected to the outer cone chamber to exhaust and admit air thereto while permitting displacement of the outer cone to expose the inner cone.

19. A hat-shrinking machine comprising an inner perforated cone, an outer perforated cone separated therefrom, said inner cone having an interior chamber, said outer cone surrounded by an exterior chamber, means for exhausting air from said chambers in alternation, a slide upon which are mounted said outer cone and its enclosing chamber, and means connected to said slide for elevating and lowering the same.

20. A hat-shrinking machine comprising an inner perforated cone, an outer perforated cone separated therefrom, said inner cone having an interior chamber, said outer cone surrounded by an exterior chamber, means for exhausting air from said chambers in alternation, and means for supplying scalding water during the operation of shrinking the hat body.

21. The process of shrinking a moistened hat body, comprising blowing the hat body to and fro between inner and outer slightly separated cones or forms.

22. The process of shrinking a moistened hat body, comprising blowing the hat body to and fro between inner and outer slightly separated cones or forms and moistening the same with hot water during the shrinking operation.

Signed at Hartford, Connecticut, this 16th day of March, 1920.

WILLIAM A. LORENZ.